Jan. 8, 1963     C. T. BREWER     3,071,980

DRIVE-TENSIONING APPARATUS

Filed May 31, 1960

INVENTOR;
CARL T. BREWER

BY *Cohn and Powell*

ATTORNEYS.

United States Patent Office 3,071,980
Patented Jan. 8, 1963

3,071,980
DRIVE-TENSIONING APPARATUS
Carl T. Brewer, % Brewer Machine & Gear Co.,
1441 N. 2nd St., St. Louis 6, Mo.
Filed May 31, 1960, Ser. No. 32,763
2 Claims. (Cl. 74—242.1)

This invention relates generally to improvements in a drive-tensioning apparatus, and more particularly to an improved tensioner adapted to take up slack in chain and belt drives.

In many industries, power is transmitted by means of belts and chains of various kinds, which connect the source of power with the machine to be driven. The economical transmission of power is, in many cases, a serious problem. To operate efficiently and without undue wear, the tension of the belt or chain should be adjusted according to the load, i.e., the belt should be no tighter than is necessary to drive satisfactory under any given load, as excessive tension stretches and rapidly deteriorates the belt.

It is a major objective of the present invention to provide a belt-tensioning device that is capable of being adjusted quickly and easily so as to maintain the proper tension of the belt at all times.

An important objective is achieved by the provision of means in the drive-tensioning apparatus which enables angular adjustment of a member engageable with the belt or like drive element to be tensioned, and in addition, the provision of means that enables selective movement of the base on which the member is carried, both adjustment features being capable of utilization individually or in combination to position such member precisely and accurately incident to tensioning the drive element.

Another important object is realized by the provision of means in the apparatus which enables a wide range of tension adjustment, and of another coacting means that enables a more precise drive-tensioning feature within a more narrow range.

Still another important object is achieved by an apparatus that includes a base, an arm rotatively mounted to the base, a member mounted to the arm and adapted to engage the drive element to be tensioned, means for fixing the arm in a selected angular position, and means enabling selective movement of the base toward and away from such drive element for a finer adjustment of the tension.

Yet another important object is achieved by pivotally mounting one side of the base and by providing a slot and pin connection at the other side which permits pivotal movement of the base within limits for the purposes and functional advantages discussed previously.

Other important advantages are realized by the provision of a pair of bolts, constituting fastening means, adapted to mount the base of the apparatus to a machine frame, one of the bolts being received in an arcuate slot formed in the base and the other bolt providing a pivot about which the base moves as the first bolt travels relatively in such slot incident to making an adjustment in the tension of the drive element.

Another important object is afforded by the provision of a pad on the base which includes alternately formed, axially extending lands and grooves adapted to interfit a similar cooperating structure provided on the hub of the arm rotatively mounted to the base, such interlocking structure maintaining the arm in any adjusted angular position incident to making an adjustment in the tension of the drive element.

An important object is achieved by the tensioner in that through the use of a rotating arm mounted on the base and an adjusting slot formed in the base that permits pivotal movement of such base, there is realized a horizontal and vertical positioning of the member engageable with the drive element to be tensioned throughout a full 360 degree arc.

An important object is to provide a drive-tensioning apparatus that is simple and durable in construction, economical to manufacture, efficient in operation, and which can be readily adjusted by any one to tension the drive element such as a chain or belt in a power transmission.

The foregoing and numerous other objects and advantages of the invention will more clearly appear from the following detailed description of a preferred embodiment, particularly when considered in connection with the accompanying drawing, in which.

Figure 1:
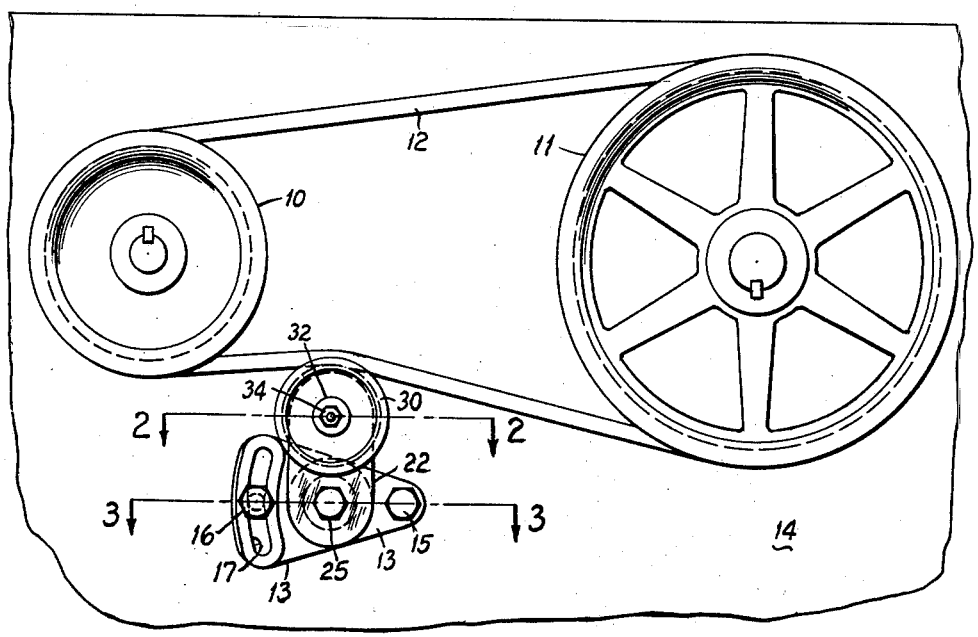
FIG. 1 is a side elevational view of the drive-tensioning apparatus assembled to a machine frame and operatively engaging a drive element in a power transmission.
Figure 2:
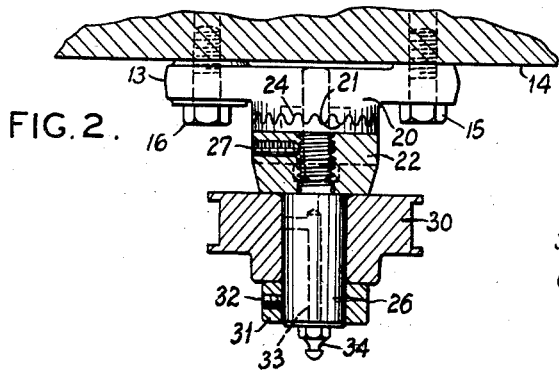
FIG. 2 is an enlarged cross-sectional view of the drive-tensioning apparatus as seen along line 2—2 of FIG. 1.
Figure 4:
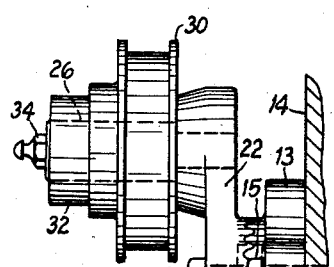
FIG. 4 is an enlarged, end elevational view of the drive-tensioning apparatus as seen from the right of FIG. 1.

Referring now by characters of reference to the drawing, and first to FIG. 1, the drive-tensioning apparatus is utilized with a power transmission including a pair of pulleys 10 and 11 operatively interconnected by a continuous belt 12 constituting a flexible drive element. Of course, this power transmission of pulleys 10 and 11 and belt 12 is merely illustrative. The drive-tensioning apparatus can be used with equal facility with other equivalent power transmissions such as a pair of sprockets interconnected by a flexible chain.

Figure 3:
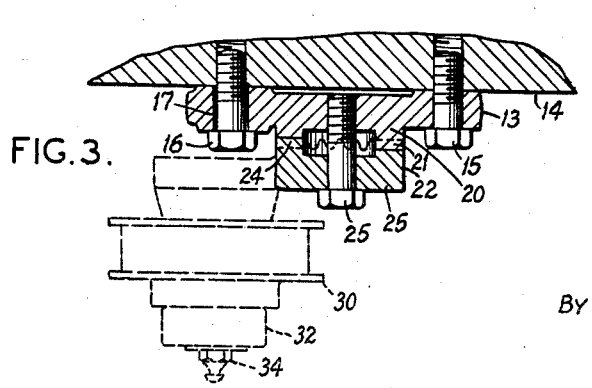
FIG. 3 is an enlarged cross-sectional view of the apparatus as seen along line 3—3 of FIG. 1, the broken lines illustrating the rotatable arm moved to a different angular position.

The drive-tensioning apparatus includes a substantially, triangularly shaped base 13 attached to the machine frame 14 by a pair of bolts 15 and 16. One side of base 13, specifically the apex of the triangularly shaped base 13, is secured by bolt 15 that acts as a pivot pin about which the base 13 moves when the bolt 15 is unloosened. To guide base 13 in this pivotal movement, the other side of base 13 is provided with an arcuate slot 17 formed by a radius extending from the pivot axis of bolt 15. As is best seen in FIGS. 1 and 3, the bolt 16 is received in and extends through the slot 17.

When the bolt 16 is loosened, the base 13 can be shifted in a direction toward or away from the flexible driven belt 12 within a range determined by the relative movement of bolt 16 in slot 17. After the base 13 is adjusted to the desired position, the bolts 15 and 16 are tightened in order to clamp the base 13 securely to the machine frame 14.

Provided on base 13 between bolts 15 and 16 is a pad 20 that is substantially circular in configuration. A plurality of alternately formed, axially extending lands and grooves 21 are formed on the outermost face of pad 20.

An arm 22 includes a hub 23, the innermost face of which is provided with a coacting formation of alternately formed, axially extending lands and grooves 24 adapted to interfit the lands and grooves 21 formed on base pad 20. The arm hub 23 is rotatively mounted to the base pad 20 by a center bolt 25. It is apparent that when bolt 25 is loosened sufficiently, the arm 22 can be rotated a full 360 degrees. After being disposed in the desired angular position, for the purpose and advantages later discussed in detail, the bolt 25 is tightened to clamp the arm hub 23 to the base pad 20, the cooperating lands and grooves 21 and 24 interfitting when the bolt is tightened to assist in holding the arm 22 in such angular position.

Threadedly attached to the outermost end of arm 22 is a stub shaft 26, a set screw 27 extends through arm 22 to engage the threaded portion of shaft 26 in order to preclude unintentional withdrawal. Rotatively mounted on shaft 26 is an idler pulley 30 having a grooved periphery adapted to receive and engage the flexible drive belt 12. One side of pulley 30 abuts the arm 22. The opposite side of pulley 30 abuts a retaining ring 31 slipped over the end of stub shaft 26 and retained in place by a set screw 32.

As mentioned previously, if the flexible drive element 12 consisted of a chain, the idler member 30 in the drive-tensioning apparatus would then consist of a sprocket instead of a pulley, all as is well understood.

An oil passage 33 is formed longitudinally along the axis of stub shaft 26 and communicates with the bearing surfaces between pulley 30 and shaft 26. Fastened to the front of shaft 26 and closing the front end of oil passage 33 is an oil fitting 34. Of course, lubrication of these bearing surfaces is required so that idler pulley 30 rotates freely under all conditions.

It is thought that the operation and functional advantages of the drive-tensioning apparatus have become fully apparent from the foregoing detailed description of parts, but for completeness of disclosure, the assembly and mode of operating the apparatus disclosed will be briefly described. It will be assumed that it is desirable to have the idler pulley 30 engage the belt 12 along the outside of the lower belt flight.

First, the base 13 is secured to the machine frame 14 by bolts 15 and 16. Then, the arm 22 is secured to the base 13 by passing a bolt 25 through the arm hub 23 and base pad 20. The serrations formed by lands and grooves 21 and 24 interfit to preclude rotation of arm 22 from the desired angular position. The idler pulley 30 is rotatively mounted on stub shaft 26 and held in place by retaining ring 31.

By loosening center bolt 25 sufficiently to enable the interfitting serrations to clear each other, the arm 22 is rotated to a desired angular position so that the idler pulley 30 engaging the lower flight of drive belt 12 acts to press the belt flight inwardly to take up the slack between the power transmission pulleys 10 and 11. After the arm 22 is angularly disposed in the desired position, the center bolt 25 is tightened to clamp the arm hub 23 to the base pad 20, and hence clamp the serrations formed by lands and grooves 21 and 24 into interfitting relation. Rotation of arm 22 in the manner described, provides a fast adjustment of belt tension.

If further adjustment of the belt tension is required in order to make it more precise, the base 13 is shifted toward or away from the belt 12 to accomplish this result. For example, the bolts 15 and 16 are loosened to enable the base 13 to pivot about bolt 15 within a range determined by the relative movement of coacting bolt 16 in slot 17. Movement of the base 13 in this manner provides a very fine adjustment in effecting minute changes in belt tension. After the correct belt tension 12 is realized, the bolts 15 and 16 are tightened to clamp the base 13 in adjusted position on the machine frame 14.

Of course, it will be readily understood that the arm 22 can be rotated in a full 360 degree arc in order to effect a quick adjustment of belt tension and that the base 13 can be shifted toward or away from the belt 12 in order to effect a fine adjustment of belt tension in a given angular position of arm 22. Thus it is seen that the present drive-tensioning apparatus can afford a horizontal and vertical position of the pulley 30 through a full 360 degree arc.

The drive-tensioning apparatus can be conveniently utilized in numerous positions other than the one illustrated in FIG. 1, as is permitted by the particular structural arrangement discussed in detail previously. Obviously, the apparatus can be placed above the belt 12 so that the pulley engages the outer side of the upper belt flight. Similarly, the apparatus can be conveniently placed inside of the belt 12 so that the pulley 30 engages the innerside of either belt flight. In all cases, the apparatus operates in the manner described so as to take up slack in the belt 12.

Although the invention has been described by making detailed reference to a single preferred embodiment, such detail is to be understood in an instructive, rather than in any restrictive sense, many variants being possible within the scope of the claims hereunto appended.

I claim as my invention:

1. A drive-tensioning apparatus for a flexible drive element comprising a base, the base including a pad provided with a plurality of axial lands and grooves, an arm including a hub provided with a plurality of coacting axial lands and grooves, said arm hub being rotatively mounted to said base pad, the coacting lands and grooves of said arm hub and base pad interfitting in different angular positions of said arm to provide a rough adjustment, means selectively fixing said arm in an adjusted angular position on said base, a member mounted to said arm in spaced relation to the hub and engaging the drive element, the arm being rotatable to provide a quick but rough adjustment of the drive element tension within a wide range, pivot means pivotally mounting said base at one side of said arm hub, the base being provided with an arcuate slot at the other side of said arm hub, the arcuate slot extending in a direction transverse to the drive element, and a fastening means extending through said slot to permit pivotal movement of the base within a range determined by said slot to provide a finer adjustment of the drive element tension within a more narrow range in a given angular position of said arm, said pivot means and fastening means selectively fixing said base in adjusted pivotal position.

2. A drive-tensioning apparatus for a flexible drive element comprising a base, said base including a pad provided with axially extending, alternately formed lands and grooves, an arm including a hub provided with a plurality of coacting axially extending, alternately formed lands and grooves, a bolt rotatively mounting said arm hub to said base pad, the coacting lands and grooves of said arm hub and base pad interfitting in different angular positions of said arm, said bolt selectively fixing said arm in a roughly adjusted angular position on said base, a member mounted to said arm in spaced relation to the hub and engaging the drive element, said member being rotatable on said arm a full 360 degrees to provide a quick but rough adjustment of drive element tension within a wide range, a pivot bolt pivotally mounted to said base at one side of said arm hub, said base being provided with an arcuate slot on the other side of said arm hub and formed on a radius from said pivot bolt, said arcuate slot extending in a direction transverse to the drive element, a guide bolt extending through said slot to permit pivotal movement of the base toward or away from the drive element to provide a finer adjustment of drive element tension within a more narrow range in a given angular position of said arm, said pivot bolt and guide bolt being adapted to secure said base to a machine frame in pivotally adjusted position, the hub bolt being located on a straight line between the pivot bolt and guide bolt.

References Cited in the file of this patent

UNITED STATES PATENTS

| | | |
|---|---|---|
| 1,204,371 | McFeely | Nov. 7, 1916 |
| 1,450,906 | Anderson | Apr. 10, 1932 |
| 2,614,433 | Cuckler | Oct. 21, 1952 |
| 2,909,074 | Scheiterlein | Oct. 20, 1959 |